US008719216B2

(12) United States Patent
Bremer, Jr. et al.

(10) Patent No.: US 8,719,216 B2
(45) Date of Patent: May 6, 2014

(54) CACHING OF WEB FORM POST-QUERY REQUESTS

(75) Inventors: John Francis Bremer, Jr., Bellingham, WA (US); Alimuddin Mohammad, Redmond, WA (US)

(73) Assignee: The Boeing Company, Chicago, IL (US)

( * ) Notice: Subject to any disclaimer, the term of this patent is extended or adjusted under 35 U.S.C. 154(b) by 940 days.

(21) Appl. No.: 11/877,904

(22) Filed: Oct. 24, 2007

(65) Prior Publication Data

US 2009/0112829 A1 Apr. 30, 2009

(51) Int. Cl.
*G06F 7/00* (2006.01)
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)

(52) U.S. Cl.
USPC .......... 707/608; 715/221; 715/222; 715/223; 715/224; 715/225

(58) Field of Classification Search
USPC ............................... 707/3, 608; 715/221–226
See application file for complete search history.

(56) References Cited

U.S. PATENT DOCUMENTS

| 6,934,699 | B1 * | 8/2005 | Haas et al. ............................. 1/1 |
| 7,069,297 | B2 * | 6/2006 | Kimura et al. ................. 709/203 |
| 2002/0095454 | A1 * | 7/2002 | Reed et al. ..................... 709/201 |
| 2002/0184444 | A1 * | 12/2002 | Shandony ....................... 711/118 |
| 2004/0111486 | A1 * | 6/2004 | Schuh et al. .................. 709/214 |
| 2004/0158617 | A1 * | 8/2004 | Shanny et al. ................ 709/217 |

* cited by examiner

*Primary Examiner* — Apu Mofiz
*Assistant Examiner* — Jared Bibbee
(74) *Attorney, Agent, or Firm* — Armstrong Teasdale LLP

(57) ABSTRACT

A method for obtaining a result for a post-query may include: (a) Algorithmically treating the query to create a signature. (b) Composing a pseudo-get web identifier including a web address identifying a responding station and the signature. (c) Sending the query via a network to the responding station to request the result. (d) Determining whether the result is stored in a cache unit in the network. (e) If the result is stored in a cache unit, providing the result to the requesting station. (f) If the result is not stored in a cache unit, acquiring the result from the responding station. (g) Storing the result in a receiving cache unit. (h) Sending a resubmitted query via the network to the responding station in a format appropriate to retrieve the stored result from the receiving cache unit. The resubmitted query format includes the signature phrase.

8 Claims, 2 Drawing Sheets

CACHING OF WEB FORM POST-QUERY REQUESTS

BACKGROUND

Conventional cache units employed in networks such as, by way of example and not by way of limitation, web proxy caches and browser caches may be designed to reduce the amount of time required to fetch a web page or other query result. Cache units may also be employed to reduce the volume of data being transferred across a network. Cache units do not usually permit caching of "post-query" web forms because in a post-query form the fields and values comprising the query parameters may be encoded in the body of the query request rather than being listed on the command line of the Universal Resource Locator (URL) associated with the query. A form that uses a post-query does not present a unique URL based on the values that a user types into the form before pressing a submit button.

In contrast, another form for submitting query in a network may use a "get-query" form. A get-query provides a unique URL string that is determined by the values that a user may enter into a form before pressing the submit button. The URL may remain constant because the form values and parameters are not appended onto the URL string. Conventional web proxy and browser caches may associate unique URLs with content. Such an association of query content with a URL cannot work in the case of content returned from post-queries because with post-queries the same URL can return different content.

Web applications experiencing high traffic volume, including the Internet, private or public Local Area Networks (LANs) or other networks may use post-query web forms that are not conventionally cacheable and cannot be converted to standard get-query web forms. One reason that post-query forms may not be converted to a get-query form may be restraints imposed on URL length in HyperText Transfer Protocol (HTTP) format. HTTP format is a common format employed in network communications today, especially with Internet applications. Because of limitations imposed on length of URL, each post-query request to a system may require the full network bandwidth available to transfer the post-query request from the web browser to the web server and from the web server to databases more remotely located in a network. For similar reasons, a post-query may also employ significant portions of the processing activity of databases and any associated web servers. Further, a significant amount of bandwidth (i.e., capacity) available to a network may be occupied in returning a dynamically assembled web page back to a web browser in response to a query.

Therefore, there remains a need in the art to efficiently provide post-query responses while reducing web server and database processing activity.

SUMMARY

A method for obtaining a result for a post-query may include: (a) Algorithmically treating the query to create a signature. (b) Composing a pseudo-get web identifier including a web address identifying a responding station and the signature. (c) Sending the query via a network to the responding station to request the result. (d) Determining whether the result is stored in a cache unit in the network. (e) If the result is stored in a cache unit, providing the result to the requesting station. (f) If the result is not stored in a cache unit, acquiring the result from the responding station. (g) Storing the result in a receiving cache unit. (h) Sending a resubmitted query via the network to the responding station in a format appropriate to retrieve the stored result from the receiving cache unit. The resubmitted query format includes the signature phrase.

It is, therefore, a feature of one or more embodiments of the disclosure to provide a method for obtaining a result for a post-query that may be cacheable.

Further features of one or more embodiments of the present invention will be apparent from the following specification and claims when considered in connection with the accompanying drawings, in which like elements are labeled using like reference numerals in the various figures, illustrating embodiments of the disclosure.

DETAILED DESCRIPTION

Figure 1:
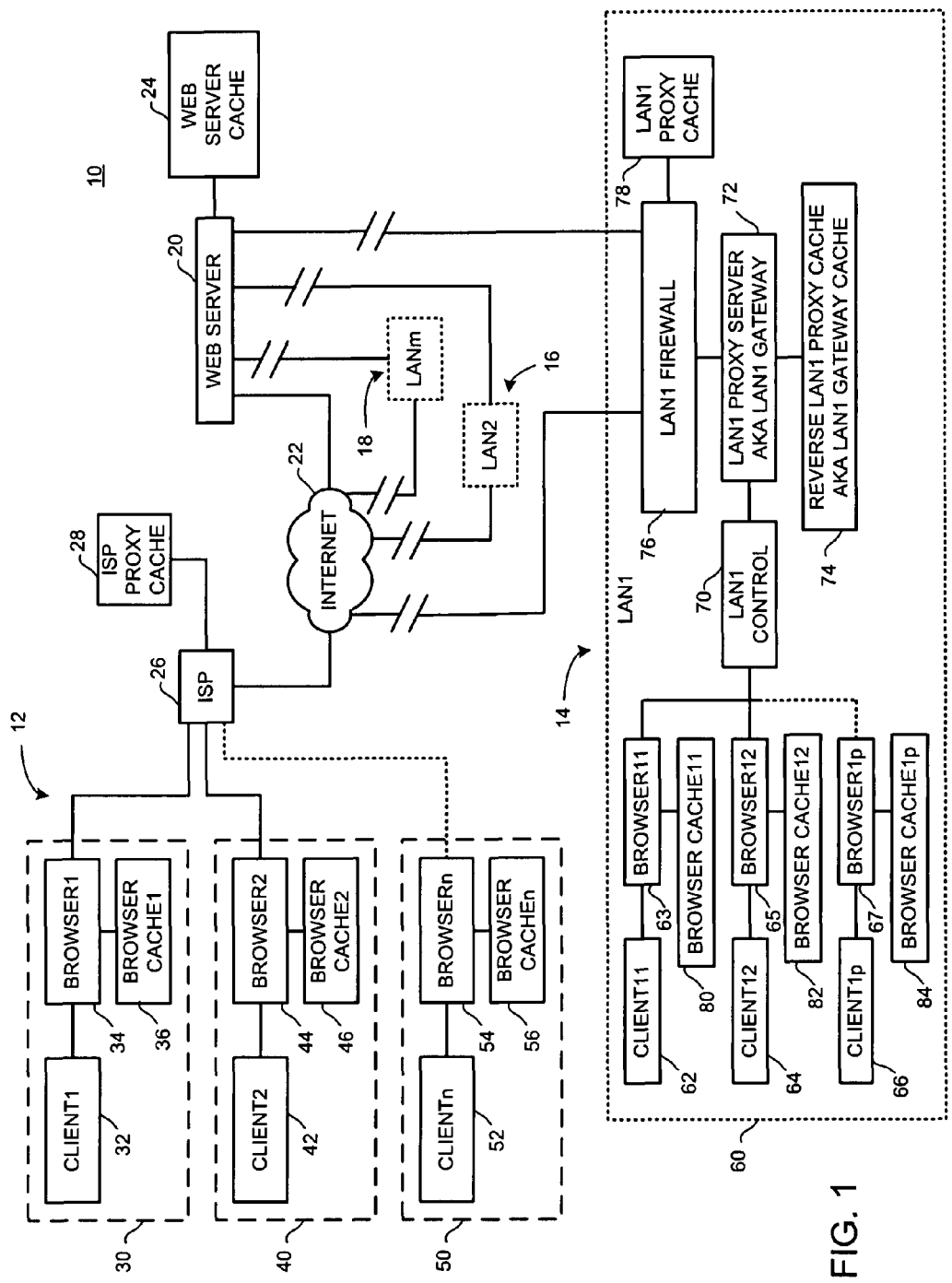
FIG. 1 is a schematic illustration of a representative network environment in which embodiments of the disclosure may be advantageously employed.

FIG. 1 is a schematic illustration of a representative network environment in which embodiments of the disclosure may be advantageously employed. In FIG. 1, an exemplary network 10 may include a plurality of sub-networks 12, 14, 16, 18. Sub-networks 14, 16, 18 may be coupled with a web server 20. Sub-network 12 may be coupled with web server 20 via an Internet Service Provider (ISP) 26 and the Internet 22. Internet 22 may also be coupled with sub-networks 14, 16, 18. Web server 20 may be served by a web server cache 24. Internet 22 may be coupled with other networks (not shown in FIG. 1).

Sub-network 12 may include a plurality of client units 30, 40, 50 coupled with an Internet Service Provider (ISP) 26. ISP 26 may be served by an ISP proxy cache 28. Client unit 30 may include a client 32 coupled with a browser 34 and a browser cache 36. Browser 34 may be served by browser cache 36. Client 32 may access web server 20 via browser 32, ISP 26 and Internet 22. Client unit 40 may include a client 42 coupled with a browser 44 and a browser cache 46. Browser 44 may be served by browser cache 46. Client 42 may access web server 20 via browser 42, ISP 26 and Internet 22. Client unit 50 may include a client 52 coupled with a browser 54 and a browser cache 56. Browser 54 may be served by browser cache 56. Client 52 may access web server 20 via browser 52, ISP 26 and Internet 22.

Clients 32, 42, 52 are respectively labeled CLIENT1, CLIENT2, CLIENTn in FIG. 1. The indicator "n" is employed to signify that there can be any number of clients in sub-network 12. The inclusion of three clients 32, 42, 52 in FIG. 1 is illustrative only and does not constitute any limitation regarding the number of clients that may be included in a sub-network of exemplary network 10.

Sub-network 14 may be configured as a Local Area Network (LAN) 60. Sub-network 16, 18 may each also be configured as a Local Area Network similar to LAN 60. Details of LAN configurations in sub-networks 16, 18 will not be included in this description because describing sub-networks 16, 18 may be repetitive and prolix, and may clutter FIG. 1. Sub-networks 14, 16, 18 are respectively labeled LAN1, LAN2, LANm in FIG. 1. The indicator "m" is employed to signify that there can be any number of Local Area Networks (LANs) in exemplary network 10. The inclusion of three LANs (LAN1, LAN2, LANm) in sub-networks 14, 16, 18 in FIG. 1 is illustrative only and does not constitute any limitation regarding the number of LANs that may be included in exemplary network 10.

LAN 60 may include a plurality of clients 62, 64, 66. Client 62 may be coupled with a browser 63. Browser 63 may be served by a browser cache 80. Client 64 may be coupled with a browser 65. Browser 65 may be served by a browser cache 82. Client 66 may be coupled with a browser 67. Browser 67 may be served by a browser cache 84.

Browsers 80, 82, 84 may be coupled with a LAN control unit 70. LAN control unit 70 may be coupled with a LAN Proxy server 72. LAN proxy server 72 may also be known as a LAN gateway. LAN proxy server 72 may be served by a reverse LAN proxy cache 74. Reverse LAN proxy cache 74 may also be known as a LAN gateway cache. LAN proxy server 72 may be coupled with a LAN firewall 76. LAN firewall 76 may be served by a LAN proxy cache 78. LAN firewall 76 may be coupled with web server 20.

Clients 62, 64, 66 are respectively labeled CLIENT11, CLIENT12, CLIENT1p in FIG. 1 to indicate clients 1, 2 and p in LAN1. The indicator "p" is employed to signify that there can be any number of clients in LAN 60. The inclusion of three clients 62, 64, 66 in FIG. 1 is illustrative only and does not constitute any limitation regarding the number of clients that may be included in LAN 60. One skilled in the art of system design may recognize that FIG. 1 may be a simplistic representation of a network. Each respective LANm may itself contain more than one Local Area Network, and there may be more than one Local Area Network protected behind a respective firewall 76. Alternatively, a firewall may be provided between web server 20 and the Internet 22 for protecting all LANs, web server 20 and web server cache. LAN proxy cache 78 may sometimes be identified as a forward proxy cache.

Client 62 may access Internet 22 or web server 20 via browser 63, LAN control unit 70, LAN proxy server 72 and LAN firewall 76. Client 64 may access Internet 22 or web server 20 via browser 65, LAN control unit 70, LAN proxy server 72 and LAN firewall 76. Client 66 may access Internet 22 or web server 20 via browser 67, LAN control unit 70, LAN proxy server 72 and LAN firewall 76. Sub-networks 16, 18 (LAN2, LANm) may provide connection with Internet 22 for respective clients (not shown in FIG. 1) substantially as described in connection with LAN 60.

Figure 2:
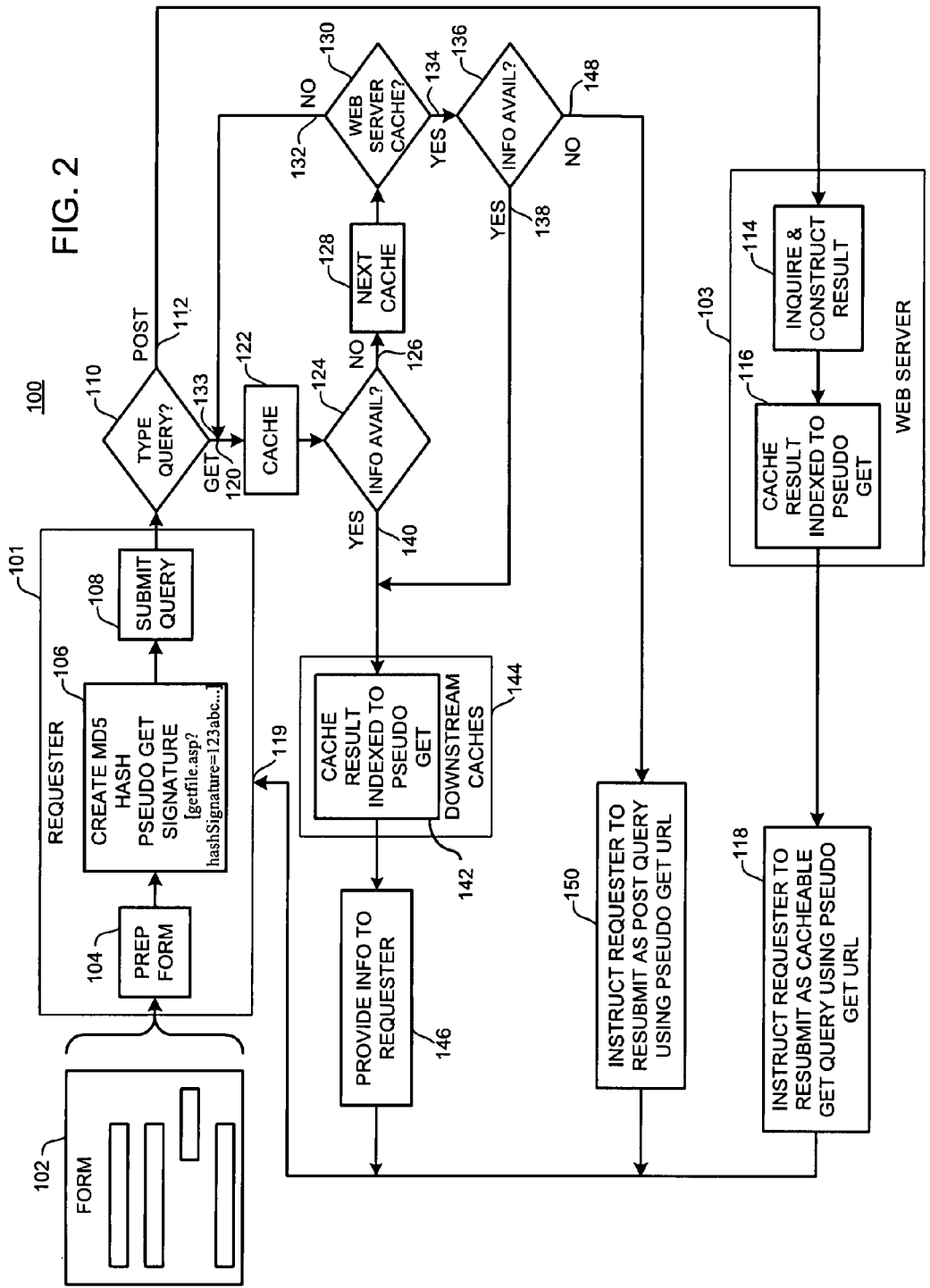
FIG. 2 is a flow chart illustrating operation of a method according to an embodiment of the present invention.

FIG. 2 is a flow chart illustrating operation of a method according to an embodiment of the present invention. In FIG. 2, a method 100 for obtaining a result for a query formulated using information contained in an on-line form 102 (e.g., a post-query) may begin by preparing the form 102, as indicated by a block 104. Method 100 may continue with treating information in form 102 with a predetermined algorithm to present an algorithmically-treated content, as indicated by a block 106. As further exemplified in block 106, the algorithmic treating may be effected using a hash function such as, by way of example and not by way of limitation, a message digest MD5 hash function known by those skilled in the art of secure data communication and identified as Internet Engineering Task Force (IETF) Request for Comments (RFC) 1321, commonly abbreviated as IETF-RFC1321. The algorithmically-treated content may be employed in a form of a substantially unique pseudo-get phrase.

By way of example and not by way of limitation, such a pseudo-get phrase may include a recognizable get phrase such as "getfile.asp?" with a signature phrase, such as "hashSignature=123abc . . . " appended to the get phrase to create a web identifier [getfile.asp? hashSignature= 123abc . . . ]. Such a getfile identifier may be used to compose a Universal Resource Locator (URL) such as, by way of example and not by way of limitation, http://www.company.com/getfile.asp? hashSignature=123abc . . .

as indicated by block 106. Use of the symbols "?" and "=" appearing in this exemplary URL represent syntax requirements that may be employed to satisfy standard requirements for HTTP communications. By way of further example and not by way of limitation, the ".asp" suffix on the "getfile.asp" phrase may indicate that the web server is using "Active Server Pages" from Microsoft to serve dynamically composed HTML content. One could employ other suffixes indicating other web server features including, by way of example and not by way of limitation, ".php", ".cgi", ".aspx" and ".jsp". Such other suffixes and the parameters following them in a "get" query may all adhere to the parameter syntax phraseology: "?hashSignature=123abc . . . ".

Method 100 may continue with a requester submitting or sending the query via a network from a requesting station to a responding station requesting the result, as indicated by a block 108. The responding station may be identified by a web identifier. The web identifier may include the pseudo-get phrase. The network may include a plurality of cache units situated between the requesting station and the responding station. By way of example and not by way of limitation, cache stations involved with communications between client 32 and web server 20 (FIG. 1) may involve browser cache 36, ISP proxy cache 28 and web server cache 24. The plurality of cache units may include a distal cache unit nearer the responding station than the requesting station, such as web server cache 24 (FIG. 1) when a subscriber receives a response from web server 20 responding to a query submitted pursuant to block 108.

Actions effected to carry out method steps indicated by blocks 104, 106, 108 may be performed by a requester, as indicated by an encompassing block 101 surrounding blocks 104, 106, 108.

Method 100 may continue with determining whether the query is a get-type query or a post-type query, as indicated by a query block 110. If the query is a get-type query, method 100 may proceed from query block 110 via a GET response line 120 and method 100 may inquire of at least one selected cache unit in the network whether the result or response to the query is contained in at least one selected cache unit in a manner identified with the web identifier, such as by indexing the response with respect to the web identifier. By way of example and not by way of limitation, if client 62 (FIG. 1) is acting as requester 101 in FIG. 2, this inquiry may involve interrogating browser cache 80, reverse LAN proxy cache 74, LAN proxy cache 78 and web server cache 24 to ascertain whether a result or response is stored in at least one of caches 80, 74, 78, 24 in a manner identifiable or indexed to the web identifier [getfile.asp? hashSignature=123abc . . . ] (composed pursuant to block 106).

If the result is contained in a cache unit in a manner associated with the web identifier, method 100 may operate the cache unit containing the result as a providing cache unit to effect providing the result to the requesting station (i.e., requester 101), as indicated by a block 146. It may be preferred that the result obtained also be stored in downstream caches—i.e., caches between the responding cache and requester 101—as indicated by a block 142. Surrounding block 144 enclosing block 142 (in FIG. 2) is intended to indicate that method 100 may store the found result in all downstream caches between the cache from which the response was obtained to the cache nearest to requester 101.

Making web form post-query responses cacheable may significantly reduce network bandwidth usage and may reduce web server and database processing activity. These results may be achieved by reducing duplicate requests to a web server within a given page freshness period. There is a need for a method for obtaining a response for a post-query that may be cacheable.

FIG. 2 represents this multi-cache inquiry by a block 122 (labeled "CACHE") followed by a query whether the information sought is available, indicated by a query block 124. If the information is available in the then-addressed cache (block 122) in a manner associated with the web identifier, method 100 may proceed from query block 124 via a YES response line 140, store the response or result in downstream caches (block 144) and provide the information to requester 101, as indicated by block 146. If the information is not available in the then-addressed cache (block 122) in a manner associated with the web identifier, method 100 may proceed from query block 124 via a NO response line 126 and a next cache may be selected for interrogation, as indicated by a block 128. Method 100 may then inquire whether the next-to-be-interrogated cache is the web server cache (or another cache closest to the responder and distal from requester 101), as indicated by a query block 130.

If the next-to-be-interrogated cache is not the web server cache, method 100 may proceed from query block 130 via a NO response line 132 to a locus 133 and steps associated with blocks 122, 124, 128, 130 may be repeated. If the next-to-be-interrogated cache is the web server cache, method 100 may proceed from query block 130 via a YES response line 134 and a query may be posed whether the requested information is contained in the web server cache in a manner associated with the web identifier, as indicated by a query block 136.

If the requested information is contained in the web server cache in a manner associated with the web identifier, method 100 may proceed from query block 136 via a YES response line 138, store the response or result in downstream caches (block 144) and provide the information to requester 101, as indicated by block 146. If the requested information is not contained in the web server cache in a manner associated with the web identifier, method 100 may proceed from query block 136 via a NO response line 148 and instruct requester 101 to resubmit the query as a post-query using the pseudo-get phrase in the URL of the request, as indicated by a block 150.

Regarding the query posed by query block 110, if the query is a post-type query, method 100 may proceed from query block 110 via a POST response line 112 and the web server (or other distal server) may be contacted for inquiry and obtaining the response or result of the query posed (block 108), as indicated by a block 114. Method 100 may continue with caching the result obtained pursuant to block 114 in the web server cache in a manner associated with the web identifier, such as by indexing the response with respect to the web identifier, as indicated by a block 116.

Actions effected to carry out method steps indicated by blocks 114, 116 may be performed by a responder via a web server or other distal server, as indicated by an encompassing block 103 surrounding blocks 114, 116.

Method 100 may continue with instructing requester 101 to resubmit the request as a cacheable get-query using the pseudo-get phrase in the URL of the request, as indicated by a block 118. Method 100 may continue with repeating steps indicated by blocks 108, 110, 122, 124, 128, 130, 136, 144, 146 until at least one cache may be operated as a providing cache unit to effect providing the result to requester 101, as indicated by block 146.

Method 100 may reduce traffic to any of various caches in a system, and likely may reduce traffic with a web server. Employing method steps represented by blocks 122-130, method 100 may retrieve information stored in a cache anywhere "en route" from a client to a web server if that information is within its respective freshness period. A freshness period may be established by a system when information is stored in a cache, and an indication of the freshness period may be stored with the information. There may be more than one opportunity to avoid inquiring for information from a web server. By way of example and not by way of limitation, referring to FIG. 1, client 62 may find information requested has been earlier requested and is stored (within the freshness period for the information) in any of browser cache 80, reverse LAN1 proxy cache 74 and LAN proxy cache 78. Response to a query by client 62 may be satisfied from the earliest-encountered opportunity to obtain the requested information. Thus, a query from client 62 may be responded to by reverse LAN1 proxy cache 74 if, for example, client 64 had earlier requested the same information. In such an exemplary situation, the query posed by client 62 may not proceed further within the system, thereby avoiding traffic to other system components, such as by way of example and not by way of limitation, ILAN1 firewall 76, LAN1 proxy cache 78 and web server 20. Making web form post-queries cacheable may also make network and web server usage predictable for web forms that contain fields with predefined possible selections. The maximum number of hits on a given web server in a given page freshness cycle may be calculated as the number of choices per field raised to the power of the number of form fields. By way of example and not by way of limitation, a web form (e.g., form 102; FIG. 2) with 10 fields, each field having 3 drop down choices, may have a maximum of 3 to the 10th ($3^{10}$) possible cacheable query requests. This may amount to a maximum of 59,049 possible hits to a web server using the exemplary web form. The actual upper bound for a given freshness period may be smaller because it may be unlikely that users would exercise the entire extent of form field value combinations.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following clams:

We claim:

1. A method for obtaining a result for a post-type query formulated using information contained in an on-line form; the method comprising:

treating information in said form with a predetermined algorithm to present an algorithmically-treated content; employing said algorithmically-treated content in composing a substantially unique pseudo-get phrase;

sending said post-type query with said pseudo-get phrase via a network from a requesting station to a responding station requesting said result; said responding station being identified by a web identifier; said web identifier including said pseudo-get phrase appended to a web address identifying said responding station; said network including a plurality of cache units situated between said requesting station and said responding station; said plurality of cache units including a distal cache unit nearer said responding station than said requesting station and including a browser cache unit coupled with said requesting station;

communicating with said responding station to acquire said result;

storing said result in said distal cache unit in a manner associated with said web identifier; and instructing said requesting station to resubmit said post-type query as a cacheable get-type query employing said pseudo-get phrase.

2. A method for obtaining a result for a query formulated using information contained in an on-line form as recited in claim 1 wherein said network includes a plurality of sub-networks; selected sub-networks of said plurality of sub-networks communicating via a respective network interface; each said respective network interface being served by at least one interfacing cache unit of said plurality of cache units.

3. A method for obtaining a result for a query formulated using information contained in an on-line form as recited in claim 1 wherein said predetermined algorithm is a hash function.

4. A method for obtaining a result for a query formulated using information contained in an on-line form as recited in claim 2 wherein said predetermined algorithm is a hash function.

5. A method for obtaining a result for a post-query; the method comprising:

treating information in said post-query with a predetermined algorithm to create a substantially unique signature phrase;

composing a substantially unique pseudo-get web identifier; said web identifier including a web address that includes said signature phrase; said web address identifying a responding station;

sending said web identifier via a network from a requesting station to said responding station to effect requesting said result; said network including a plurality of cache units situated between said requesting station and said responding station;

identifiably storing said result in at least one respective receiving cache unit of said plurality of cache units; and sending a resubmitted query via said network to said responding station; said resubmitted query being in a resubmitted query format appropriate to retrieve said identifiably stored result from said at least one receiving cache unit; said resubmitted query format including said signature phrase.

6. A method for obtaining a result for a post-query as recited in claim 5 wherein said network includes a plurality of sub-networks; selected sub-networks of said plurality of sub-networks communicating via a respective network interface; each said respective network interface being served by at least one interfacing cache unit of said plurality of cache units.

7. A method for obtaining a result for a post-query as recited in claim 5 wherein said predetermined algorithm is a hash function.

8. A method for obtaining a result for a post-query as recited in claim 6 wherein said predetermined algorithm is a hash function.

\* \* \* \* \*